(12) United States Patent
Van Blokland

(10) Patent No.: US 8,388,334 B2
(45) Date of Patent: Mar. 5, 2013

(54) DEVICE FOR CURLING UP DOUGH SLICES

(75) Inventor: Johannes Josephus Antonius Van Blokland, Beusichem (NL)

(73) Assignee: Rademaker B.V., Culemborg (NL)

( * ) Notice: Subject to any disclaimer, the term of this patent is extended or adjusted under 35 U.S.C. 154(b) by 359 days.

(21) Appl. No.: 12/749,004

(22) Filed: Mar. 29, 2010

(65) Prior Publication Data

US 2010/0247729 A1 Sep. 30, 2010

(30) Foreign Application Priority Data

Mar. 31, 2009 (NL) ..................................... 2002692

(51) Int. Cl.
*A21C 3/06* (2006.01)
(52) U.S. Cl. ..................... 425/324.1; 425/320; 425/328; 425/364 R; 425/371; 425/373
(58) Field of Classification Search .......... 425/319–322, 425/324.1, 328, 334, 364 R, 371, 373, 391
See application file for complete search history.

(56) References Cited

U.S. PATENT DOCUMENTS

| 1,657,018 | A | * | 1/1928 | Larraburu | 425/391 |
| 1,805,018 | A | * | 5/1931 | Scruggs | 425/320 |
| 1,949,105 | A | | 2/1934 | Lauterbur et al. | |
| 2,631,550 | A | | 3/1953 | Rhodes | |
| 2,657,648 | A | * | 11/1953 | Sawyer et al. | 425/391 |
| 2,725,828 | A | * | 12/1955 | Stickelber | 425/321 |
| 2,746,401 | A | * | 5/1956 | Archer | 425/321 |
| 2,782,734 | A | * | 2/1957 | Nichols | 425/391 |
| 2,829,606 | A | * | 4/1958 | Dielentheis | 425/321 |
| 2,845,879 | A | | 8/1958 | Boston | |
| 3,167,032 | A | * | 1/1965 | Rhodes | 425/320 |
| 3,354,843 | A | * | 11/1967 | Velazquez et al. | 425/321 |
| 3,398,701 | A | | 8/1968 | Elgner | |
| 4,110,482 | A | * | 8/1978 | Sato | 425/322 |
| 5,440,974 | A | * | 8/1995 | Ueno et al. | 425/321 |
| 5,538,414 | A | * | 7/1996 | Kobayashi et al. | 425/321 |
| 5,609,094 | A | * | 3/1997 | Ueno et al. | 425/321 |

FOREIGN PATENT DOCUMENTS

| DE | 2451329 A1 | 5/1975 |
| DE | 3612766 A1 | 10/1987 |
| EP | 0647404 A1 | 4/1995 |
| EP | 0673603 A1 | 9/1995 |
| FR | 720355 | 2/1932 |
| FR | 830007 | 7/1938 |
| FR | 921301 | 5/1947 |
| GB | 684627 | 12/1952 |
| GB | 1242885 | 8/1971 |
| LU | 40903 A1 | 2/1962 |
| NL | 80659 | 9/1955 |
| NL | 7315271 | 5/1975 |
| NL | 8403780 | 7/1986 |
| WO | WO 86/02808 * | 5/1986 |
| WO | 9949736 A1 | 10/1999 |
| WO | 0141574 A1 | 6/2001 |

* cited by examiner

*Primary Examiner* — James Mackey
(74) *Attorney, Agent, or Firm* — The Webb Law Firm, P.C.

(57) ABSTRACT

The present invention relates to a method and device for curling up dough slices, comprising a conveyor for the dough slices, a gripping element, arranged above the conveyor, for curling up a dough slice conveyed under the gripping element by the conveyor, pressure means, for pressing curled up dough slices on the conveyor, wherein the distance along which the gripping element grips dough slices is adjustable in the direction of conveyance.

10 Claims, 4 Drawing Sheets

DEVICE FOR CURLING UP DOUGH SLICES

CROSS-REFERENCE TO RELATED APPLICATION

This application claims priority to Netherlands Patent Application No. 2002692, filed Mar. 31, 2009.

BACKGROUND OF THE INVENTION

1) Field of the Invention

The present invention relates to a method and device for curling up dough slices, such as dough slices for making croissants. In the following description, the term "dough slice" is meant to cover any piece of dough that can be subject to a curling up process, so no the term is not meant to limit the types of dough pieces to which the invention relates. It is an objective of the present invention to provide a method and device for curling up dough slices in such a manner that an orientation of the thus obtained curled up dough slice can be controlled and/or influenced. For example, when curling up dough slices for croissants, it may be desired to be able to determine and influence the orientation of the so called tip of each produced unit, the tip being the tapered end of a curled up triangular dough slice.

2) Description of the Prior Art

U.S. Pat. No. 2,631,550 discloses a so called power curler, wherein dough pieces are curled by a curling mat. The completely curled dough piece then travels along on the dough belt. At the end of the curling mat a pressure board is present, that rolls the dough piece from its center portion outwardly. This way, the tip obtains an undefined position, or it disappears completely.

U.S. Pat. No. 2,845,879 discloses another dough curling device with a pressure board that rolls the dough piece after curling. This device also leads to curled dough with an undefined tip position, or a disappeared tip.

During the proofing and baking process, the tips tend to raise up when they are at a top position of the curled up slice. In order to prevent that specific effect it may be desired to position the dough slice on top of the tip, but for other purposes it may for example be desired to have the tip on the upper side, or any other predetermined position. In general it is thus desired to be able to control the orientation of the curled dough slice.

It is a further goal of such a method and device, to be suitable for curling up dough slices provided with a filling, e.g. jam, chocolate, etc, for creating filled croissants. As will be explained later on, a dough slice with a filling puts further restrictions on its treatment. Preferably, the method and device are suitable for curling up dough slices with and without filling, without the need of adjustment or rearrangement.

SUMMARY OF THE INVENTION

The device according to the present invention comprises a conveyor for the dough slices, a gripping element, arranged above the conveyor, for curling up a dough slice conveyed under the gripping element by the conveyor, pressure means, for pressing curled up dough slices on the conveyor, wherein the distance along which the gripping element grips dough slices is adjustable in the direction of conveyance. The pressure means are arranged so close downstream to the gripping means, that the dough piece is uninterruptedly gripped by the device during curling up and pressing. This is desired since losing the grip on the dough slice enables the curled up dough slice to rotate freely, which leads to an unknown orientation of the curled up dough slice on the conveyor. When the curled up dough slice is pressed on the conveyor by the pressure means it is deformed slightly, so that it becomes just stable enough not to displace on the conveyor when released.

The conveyor may be an endless conveyor such as a belt, or may comprise a roller, or combinations thereof. It may form part of a dough production line, wherein the curling up forms one of the process steps. Parts of this dough production line, including parts of the present invention, may be modular.

In an embodiment, the gripping means comprise an essentially flat flexible part, such as a mat or a pick up plate. Such flexible part may have means for increasing its friction on the dough slice, and for that purpose for example be made of rubber or the like, and be provided with projections, such as ridges. In a device according to the present invention, the friction between the mat and a dough slide is configured such that the leading edge or flank of a dough slide is peeled off the conveyor, and the dough slide starts to curl up.

In order to increase the grip on the dough slide, and to create a tight rolled dough piece, pressure means may be applied for exerting a pressure on the flexible part. These pressure means can for example comprise a weight element, such as a chain, resting upon the flexible part.

Furthermore, the gripping means may comprise a balanced suspension, comprising a weight or a counterweight. This way, it is possible to adjust a bias force. By fine-tuning the bias pressure of the gripping means, the rolling properties of the device with respect to a specific dough slice and a specific dough type can be adjusted, leading to loosely or tightly rolled dough slice ends.

In a further embodiment, the gripping means comprise a plate, arranged at the downstream end of the flexible part in the direction of conveyance. The plate is arranged such that it touches the top of the rolled dough slice, and rolls the already curled up dough product over the conveyor.

The length that the plate stretches from the downstream end of the flexible part in the direction of conveyance is preferably adjustable. By adjusting this length, the number of turns the dough product makes after being curled up can be controlled, and as the beginning of the curling process is known, the final orientation at the end of the plate is also known. That is, when the measurements of the dough slices are known, which is generally the case in an automated bakery line.

In an embodiment, the plate comprises two mutually displaceable parts. By displacing these parts the length of the plate can be adjusted, and thus the number of turns the curled up dough slice is rolled. For this purpose the plates may be provided with fingers that engage each other. This way, a plate with an adjustable length can be obtained, that has a grip on the dough slice along its entire length, and performs a constant pressure on the dough slice. In yet another embodiment, two plates that slide over each other are applied. For different dough slice dimensions, leading to different curled up diameters, the height of the plate relative to the conveyor is adjustable.

In another embodiment, the conveyor comprises a vacuum roller, above which the gripping means extend at least partially. Such vacuum roller may comprise a cylinder that has a perforated mantle, and means for generating a vacuum in at least that part of the cylinder that is in contact with the dough slices. An important advantage of a vacuum roller is that it has a tight grip on dough slices, and it can therefor in particular be used to receive the dough slides from a preceding dough processing device or step.

In yet another embodiment, the flexible part of the gripping means comprises a cut-out at the upstream side thereof, for initially gripping a dough slide only at a part of its width, in particular its outer left hand side and right hand side, seen from the direction of conveyance. This feature is especially intended for curling up filled dough slices. In general, the filling of such a dough slice is arranged in the center of the leading edge. The dough slices and the flexible part are arranged in such way, that the filling is lined out with the cut out. As a result, the dough slice is first gripped at the outer sides of its base, and after a first coil of the dough slice, the filling is covered, and contact of the dough slice with the flexible gripping means along the entire width of the dough slice is no longer undesired.

In still another embodiment, the pressure means are displaceable, so that they can be positioned in the vicinity of the end of the gripping means, also when the length of the gripping means is altered. This is desired since the curled up dough slice should be pressed on the conveyor directly after being curled up and rolled, without being released and thus losing grip on the dough slice. This is to prevent rolling of the dough slice on the conveyor, which would lead to uncertainty in the position and/or orientation of the dough slice. In an embodiment, the position of the pressure means is fixed at a predetermined distance from an end of the gripping means in a direction downstream in the transport direction. When the length of the gripping means is altered by an operator, and the end position thereof changes, the position of the gripping means changes accordingly along. The gripping means and the pressure means can be coupled mechanically for that purpose, or be controlled simultaneously.

The pressure means may for example comprise a pressure roller. This type of pressure means is especially suitable when the curled dough slices do not need a further bending operation. When the dough slices need further modifications, it may be desired to make use of at least one cord, that extends to the next processing station, for guiding the curled up dough slice into a next processing station. This may for example be a bending station for bended croissants, comprising a pair of parallel belts at a mutual distance that is smaller than the width of the curled dough slice, in between which the curled dough slice is bended. To prevent rolling of the curled dough slice in front of these belts, the cord may exert a pressure on the center of the dough slice until it is picked up in between the parallel belts, and to prevent unintended rotation of the curled dough slice, two cords arranged in parallel may be applied.

BRIEF DESCRIPTION OF THE DRAWINGS

The invention will be explained in more detail now with reference to the following figures, wherein:

FIG. 1b shows a top view of the device of FIG. 1a;

FIG. 2b shows a schematic top-view of the device from FIG. 2a.

DETAILED DESCRIPTION OF THE PREFERRED EMBODIMENTS

Figure 1A:
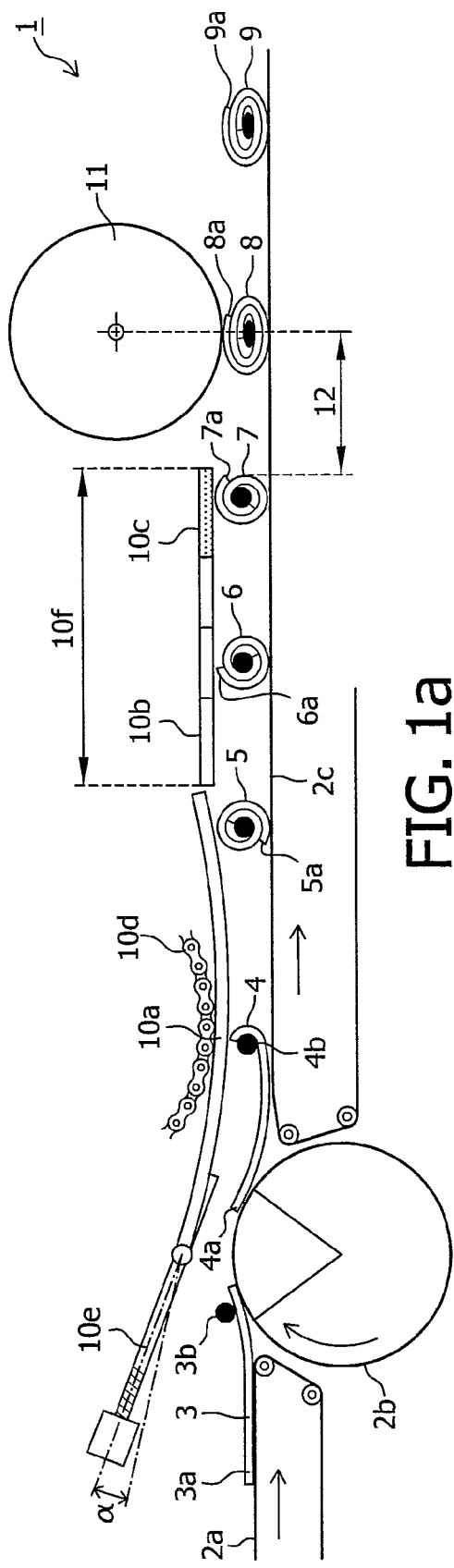
FIG. 1a shows a sectional side view of a device according to the present invention.

FIG. 1a shows a sectional side view of a device 1 for curling up dough slices according to the present invention. The device comprises a conveyor 2a, 2b, 2c for the dough slices 3-9. The conveyor comprises a first endless belt 2a, a vacuum roller 2b, and a second endless belt 2c. Above the conveyor, a gripping element 10a, 10b, 10c, 10d, 10e is arranged, for curling up dough slices 3-9 conveyed under the gripping element by the conveyor. The gripping element comprises an essentially flat flexible part 10a, formed by a mat that acts as a pick up plate. In a rest-position, without the presence of a dough slice, the flexible mat 10a rests on the vacuum roller 2b. On the first flexible part 10a, pressure means 10d, formed by a metal chain are arranged, for exerting a pressure on the flexible part 10a. In the configuration shown as will become more clear from FIG. 1b, two metal chains are used. Both chains rest on the flexible part 10a.

Furthermore a counterweight 10e is present, for adjusting the angle alpha between the flexible part 10a of the gripping element and the conveyor 2a, 2b, 2c. Furthermore, the gripping element comprises a plate 10b, 10c, the plate comprising a first part 10b and a second part 10c, which are mutually displaceable. By moving the first part 10b and the second part 10c towards and from each other, the length 10f of the gripping element can be adjusted. This adjustment leads to a varying number of turns that the curled up dough slices make before they reach the pressure means 11. The number of turns determines the final orientation of the dough slices. In FIG. 1a it is shown that the dough slices 7, 8, 9, for example for baking croissants, have a final orientation with their respective tips 7a, 8a, 9a facing upward. By changing the length 10f of the plates 10b and 10c, the final orientation can be controlled. In order to constantly have a grip on the dough slices until they have been fixed stable on the conveyor 2 by pressing means 11, the pressing means 11 should be close to the end of the pressure means 10b, 10c. When adjusting the mutual position of gripping element plate parts 10b and 10c, the pressure means 11 are moved along with the gripping element parts 10c, in such a manner that the distance 12 from the pressure means 11 to the gripping element 10c is kept constant.

Figure 1B:
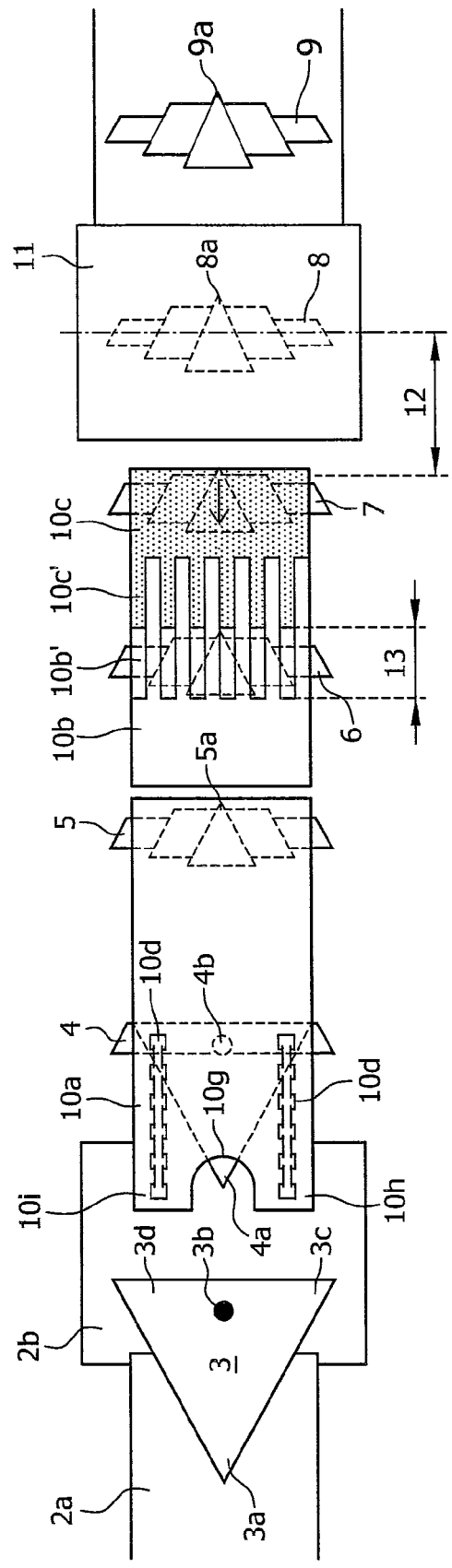

FIG. 1b shows a top-view of the device 1 from FIG. 1a. For clarity reasons, a few parts are not shown in FIG. 1b. FIG. 1b shows in particular the cut-out 10g of the flexible part 10a of the gripping element. The cut out 10g is meant for curling up dough slices with a filling, for example dough slide 3, with filling 3b. When the dough slice 3 is conveyed toward the flexible part 10a of the gripping element, first the corners 3c and 3d encounter the parts 10h and 10i of the flexible part 10a of the gripping element, respectively. The leading edge of dough slice 3 is flipped over the filling 3b, before the filling could be touched by the flexible gripping element 10a. Evidently, this shirt-shaped flexible element may also be used for curling up unfilled dough slices. Especially it may be used advantageously for curling up special products, like Artesan croissants or Mediterranean croissants, or other non-triangular shapes of dough.

Furthermore visible in FIG. 1b, are the plates 10b, 10c of the gripping element. The plates 10b and 10c have teeth 10b' and 10c', engaging each other when adjusting the length of the gripping element. This construction has the advantage that the gripping element contacts the curled up dough slices conveyed along it by the conveyer regardless of the distance 13 between them.

Figure 1C:
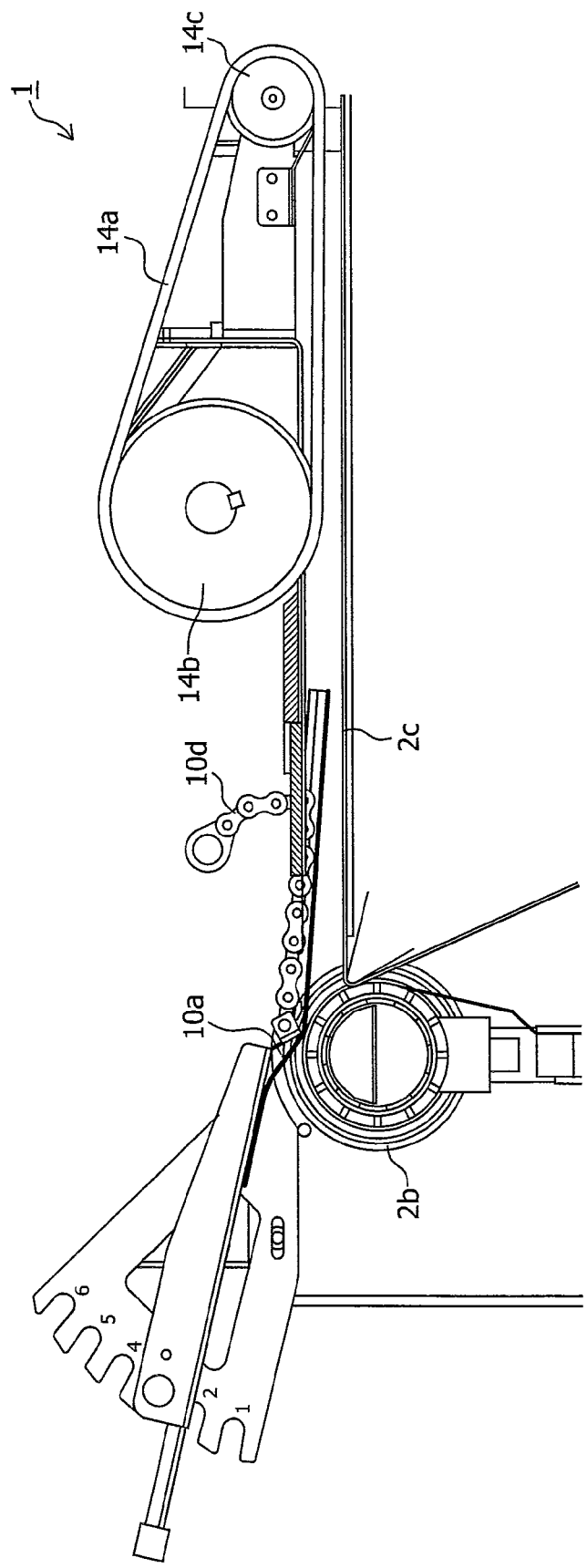
FIG. 1c shows the device from FIG. 1a, without dough slices.

FIG. 1c shows the device 1 from FIG. 1a, without dough slices present. The flexible part touches the vacuum roller 2a in this situation. The pressure means are formed by cord 14a, that is driven by belts 14b and 14c.

Figure 2A:
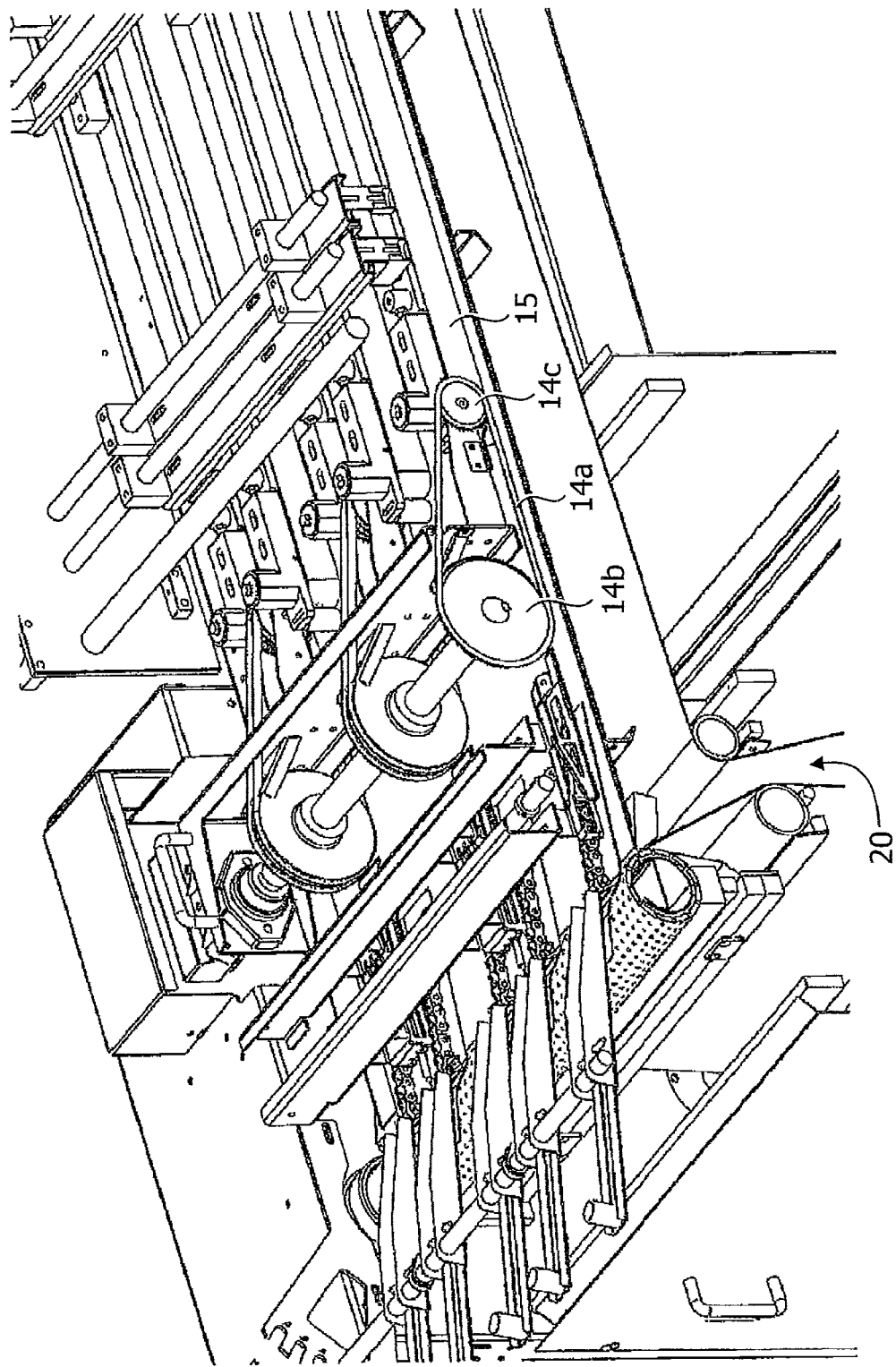
FIG. 2a shows a perspective view of an alternative embodiment of the device according to the present invention.
Figure 2B:
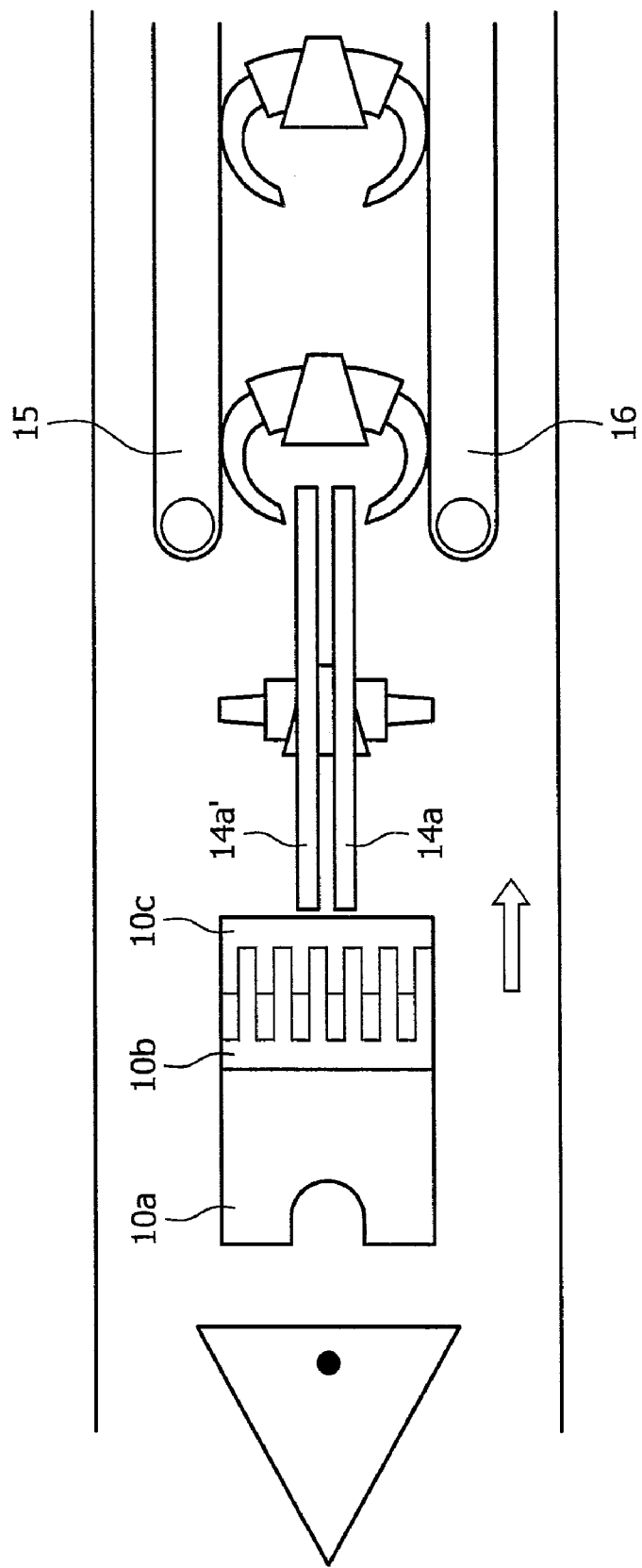

FIG. 2a shows a perspective sectional view of a device 20 like device 1 of FIG. 1a and 1b, but with different pressure means. Shown in FIG. 2 are the pressure means, formed by a cord 14a, driven on belts 14b and 14c. The choice for the cord 14a instead of the roll 11 of FIG. 1a and 1b is preferable because of the vertical belt 15, which forms a pair with a non shown belt 16 (visible in FIG. 2*b*) vertical belt that faces belt 15, for bending the yet curled up dough slices, for example for obtaining so called folded croissants. The advantage of the cord 14*a* is that it extends between the vertical belt 15 and 16, and exerts a pressure on the curled up dough slices until they are gripped and bended between the vertical belts 15 and 16. If this would not be the case, curled up dough slices would start rolling just in front of the belts 15 and 16, which is undesirable, since the orientation of the curled up dough roll would then be uncontrollable.

FIG. 2*b* shows a top view of the device 20 of FIG. 2*a*, showing belts 15 and 16 for bending a yet curled up dough slice, thus obtaining in this example a folded croissant. Pressure means formed by first cord 14*a* and second cord 14*a*" extend from just behind the gripping element 10*a*, 10*b*, 10*c* until between the first vertical belt 15 and the second vertical belt 16.

The invention claimed is:

1. A device for curling up dough slices for croissants, comprising:
    a conveyor for the dough slices;
    a gripping element, arranged above the conveyor, for curling up a dough slice conveyed under the gripping element by the conveyor;
    pressure means, for stabilizing the dough slices on the conveyor by pressing curled up dough slices on the conveyor;
    wherein
    the gripping element comprises an essentially flat flexible part and a plate arranged at the downstream end of the flexible part arranged at the downstream end in the direction of conveyance;
    the distance along which the gripping element grips dough slices is adjustable in the direction of conveyance;
    the length which the plate stretches from the downstream end of the flexible part in the direction of conveyance is adjustable; and
    the pressure means are arranged so close to the gripping element, that the dough piece is uninterruptedly gripped by the device during curling up and pressing, and the pressure means are displaceable such that they can be positioned in the vicinity of an end of the gripping element when the distance along which the gripping element grips the dough slices is adjusted.

2. The device according to claim 1, wherein the pressure means and the gripping element are coupled mechanically, or controlled simultaneously.

3. The device according to claim 2, wherein the position of the pressure means is fixed at a predetermined distance from the end of the gripping element in a direction downstream in the direction of conveyance.

4. The device according to claim 1, wherein the pressure means comprise a pressure roller.

5. The device according to claim 1, wherein the pressure means comprise at least one cord.

6. The device according to claim 1, wherein the flexible part comprises a cut-out, for initially gripping a dough slice only at a predetermined area.

7. The device according to claim 1, comprising pressure means for exerting a pressure on the flexible part.

8. The device according to claim 7, wherein at least the flexible part of the gripping element comprises a weight or a counterweight.

9. The device according claim 1, wherein the plate comprises two mutually displaceable parts.

10. The device according to claim 1, wherein the flexible part of the gripping element comprises a cut-out at the upstream side thereof, for initially gripping a dough slice only at a part of its width.

\* \* \* \* \*